US009122852B2

(12) United States Patent
Jiang

(10) Patent No.: US 9,122,852 B2
(45) Date of Patent: Sep. 1, 2015

(54) PASSWORD INPUT SYSTEM AND METHOD FOR INPUTTING PASSWORD

(71) Applicant: Wistron Corporation, New Taipei (TW)

(72) Inventor: Bin Jiang, New Taipei (TW)

(73) Assignee: Wistron Corporation, New Taipei (TW)

( * ) Notice: Subject to any disclaimer, the term of this patent is extended or adjusted under 35 U.S.C. 154(b) by 61 days.

(21) Appl. No.: 13/907,972

(22) Filed: Jun. 3, 2013

(65) Prior Publication Data
US 2014/0136850 A1 May 15, 2014

(30) Foreign Application Priority Data

Nov. 14, 2012 (CN) .......................... 2012 1 0457543

(51) Int. Cl.
G06F 21/46 (2013.01)
G06F 21/31 (2013.01)
(52) U.S. Cl.
CPC ...................................... G06F 21/31 (2013.01)
(58) Field of Classification Search
CPC .. H04L 9/3226; H04L 29/06782; G06F 21/46
USPC ......................................................... 726/2–8
See application file for complete search history.

(56) References Cited

U.S. PATENT DOCUMENTS 8,997,191 B1 * 3/2015 Stark et al. .................... 726/6
2006/0271790 A1 * 11/2006 Chen .............................. 713/185
2007/0081668 A1 4/2007 McGrew et al.
2008/0072036 A1 * 3/2008 Anzelde et al. ................ 713/155
2009/0150992 A1 * 6/2009 Kellas-Dicks et al. .......... 726/19
2011/0296530 A1 12/2011 Tsai et al.

FOREIGN PATENT DOCUMENTS

TW   200837596    9/2008
TW   201142644    12/2011

OTHER PUBLICATIONS

"Office Action of Taiwan Counterpart Application", issued on Aug. 25, 2014, with English translation thereof, p. 1-p. 10.

* cited by examiner

Primary Examiner — Josnel Jeudy
(74) Attorney, Agent, or Firm — Jianq Chyun IP Office

(57) ABSTRACT

A password input system and a method inputting a password are provided. The password input system includes a signal receiving unit, a processing unit and a storage device. The signal receiving unit receives input signals comprising key-pressing signals and key-releasing signals respectively corresponding to the key-pressing signals and each key-pressing signal corresponds to an alphanumeric symbol. The processing unit, according to a predetermined key-releasing rule, sequentially groups the alphanumeric symbols corresponding to the key-pressing signals into groups. Each group is regarded as a password element and the password elements together form a multi-key input password set. The storage device stores the multi-key input password set.

4 Claims, 3 Drawing Sheets

S401

When the key-pressing signals are sequentially received and the key-releasing signals respectively corresponding to the key-pressing signals are received at the same time, compiling the alphanumeric symbols respectively corresponding to the key-pressing signals to be thepassword element in compliance with an receiving order of sequentially receiving the key-pressing signals

Within the fixed time window, when the key-pressing signals are sequentially received and the key-releasing signals respectively corresponding to the key-pressing signals are received, compiling the alphanumeric symbols respectively corresponding to the key-pressing signals to be the password element in compliance with an receiving order of sequentially receiving the key-pressing signals

FIG. 5

PASSWORD INPUT SYSTEM AND METHOD FOR INPUTTING PASSWORD

CROSS-REFERENCE TO RELATED APPLICATION

This application claims the priority benefit of China application serial no. 201210457543.7, filed on Nov. 14, 2012. The entirety of the above-mentioned patent application is hereby incorporated by reference herein and made a part of this specification.

BACKGROUND OF THE INVENTION

1. Field of Invention

The present invention relates to a password input system and method of inputting a password. More particularly, the present invention relates to a multi-key input password system and a method for inputting the password.

2. Description of Related Art

With the increasing of the attention on the security of the personal data, the technologies for controlling the access of the resources such as the computers, the databases or telecommunication devices by using the password are well known and widely applied. Before accessing the resources, the user needs to input a correct password to make sure that the user is authorized to access the resources. Therefore, in the daily life, there are various applications requiring inputting passwords everywhere.

Furthermore, the ways of the encryption and the decryption become various. Conventionally, the ways to input the password include the use of keyboard, the facial recognition or the fingerprint recognition. Usually, the user uses the keyboard to input the combination of numbers and alphabets as the password. However, the bits of the combinations are limited and this kind of password is easy to be cracked by various methods (such as permutation combination or method of exhaustion) used by the hacker. How to utilize the limited bits to increase the security of the password becomes one of the important task of the current technology development.

SUMMARY OF THE INVENTION

The present invention is to provide a password input system capable of greatly improving the security of the password.

The present invention provides a method for inputting a password capable of decreasing the possibility of which the password is cracked.

The invention provides a password input system and a method for inputting a password. The password input system comprises a signal receiving unit, a processing unit and a storage device. The signal receiving unit receives a plurality of input signals sequentially, wherein the input signals include a plurality of key-pressing signals and a plurality of key-releasing signals respectively corresponding to the key-pressing signals and each of the key-pressing signals corresponds to an alphanumeric symbol. The processor unit, according to a predetermined key-releasing rule, sequentially groups the alphanumeric symbols corresponding to the key-pressing signals into a plurality of groups, wherein each of the groups is regarded as a password element and the password elements together form a multi-key input password set. The storage device stores the multi-key input password set.

According to one embodiment of the present invention, the signal receiving unit further receives a selecting signal for determining a number of keys for composing a single password element and the predetermined key-releasing rule comprises: step a: when a number of the sequentially received key-pressing signals is equal to the number of the keys for composing the single password element and until the key-releasing signals corresponding to the received key-pressing signals are all received, compiling the alphanumeric symbols respectively corresponding to the key-pressing signals in compliance with an receiving order of sequentially receiving the key-pressing signals to be the password element; step b: when the number of the sequentially received key-pressing signals is larger than the number of the keys for composing the single password element and until the key-releasing signals corresponding to a preceding portion of the received key-pressing signals with a received number as same as at least the number of the keys for composing the single password element are received, compiling the alphanumeric symbols respectively corresponding to the preceding portion of the received key-pressing signals in compliance with the receiving order to be the password element; and step c: when the number of the sequentially received key-pressing signals is smaller than the number of the keys for composing the single password element, waiting for receiving at least another key-pressing signal until the number of the sequentially received key-pressing signals is larger than or equal to the number of the keys for composing the single password element and then proceeding the step a or the step b.

According to one embodiment of the present invention, the predetermined key-releasing rule comprises: when the key-pressing signals are sequentially received and the key-releasing signals respectively corresponding to the key-pressing signals are received at the same time, compiling the alphanumeric symbols respectively corresponding to the key-pressing signals in compliance with an receiving order of sequentially receiving the key-pressing signals to be the password element.

According to one embodiment of the present invention, the password input system further comprises a clock for setting a fixed time window, and the predetermined key-releasing rule comprises: when, within the fixed time window, the key-pressing signals are sequentially received and the key-releasing signals respectively corresponding to the key-pressing signals are received, compiling the alphanumeric symbols respectively corresponding to the key-pressing signals in compliance with an receiving order of sequentially receiving the key-pressing signals to be the password element.

According to one embodiment of the present invention, the password input system further comprises a display device for displaying a password input interface, and the password input interface, according to the key-pressing signals received by the signal receiving unit, displays a plurality of input symbols with an input number of the input symbols as same as a number of the sequentially received key-pressing signals.

Accordingly, in the present invention, the user can press multiple keys to input a single password element. Further, according to the predetermined key-releasing rule, each of the password elements of the multi-key input password set can be a uniform-number multi-key input password element comprised of alphanumeric symbols in a uniform amount or a multiple-number multi-key input password element comprised of alphanumeric symbols in a various amount. Since the keys for the password represent numbers, lowercase letters and uppercase letters and each of the password elements corresponds to at least one alphanumeric symbol combination, the complexity and security of the password are greatly increased and the possibility of which the password is cracked is decreased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a determining flow chart illustrating a predetermined key-releasing rule according to another embodiment of the present invention.

FIG. 5 is a determining flow chart illustrating a predetermined key-releasing rule according to the other embodiment of the present invention.

DESCRIPTION OF THE PREFERRED EMBODIMENTS

Figure 1:
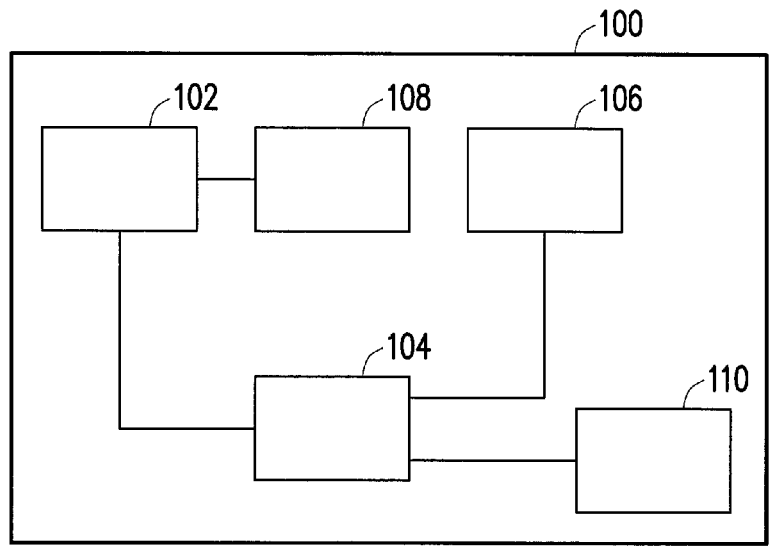
FIG. 1 is a schematic diagram showing a password input system according to a preferred embodiment of the invention.

FIG. 1 is a schematic diagram showing a password input system according to a preferred embodiment of the invention. The password input system of the present invention is applicable for any authorization system requiring inputting password. As shown in FIG. 1, a password input system 100 of the present embodiment includes a signal receiving unit 102, a processing unit 104, a display device 106, an input device 108 and a storage device 110. The signal receiving unit 102 can be coupled to, for example, to the input device 108 (such as the physical keyboard, the virtual keyboard or any input interface capable of inputting alphanumeric symbols) and can receive the input signals inputted by the user through the input device 108. The processing unit 104 can be, for example, the central processing unit, the micro-controller or the embedded controller. The display device 106 displays a password input interface. The storage device 110 stores multi-key input password sets. The storage device 110 can be, for example, the memory, the memory card or hard disk.

Figure 2:
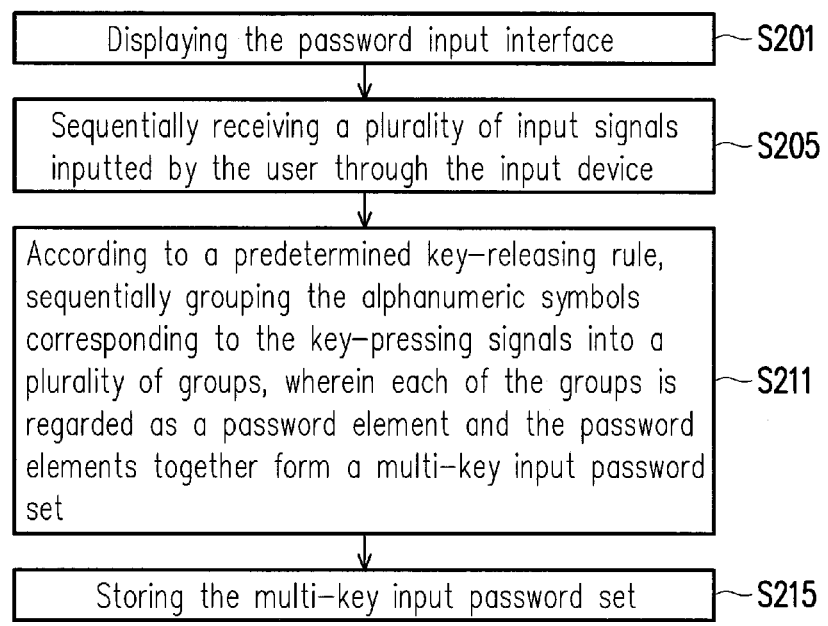
FIG. 2 is a flow chart illustrating a method for inputting a password according to one embodiment of the present invention.

FIG. 2 is a flow chart illustrating a method for inputting a password according to one embodiment of the present invention. As shown in FIG. 1 and FIG. 2, in the step S201, the processing unit 104 controls the display device 106 to display the password input interface. In the step S205, the signal receiving unit 102 sequentially receives a plurality of input signals inputted by the user through the input device 108. The input signals include a plurality of key-pressing signals and a plurality of key-releasing signals respectively corresponding to the key-pressing signals. It should be noticed that each of the key-pressing signals corresponds to an alphanumeric symbol. The alphanumeric symbol can be, for example, a number, a lowercase letter, an uppercase letter or any letter symbol or number symbol corresponding to the input key.

At the time the input signals are sequentially received (the step S205), the processing unit 104, according to a predetermined key-releasing rule, sequentially groups the alphanumeric symbols corresponding to the key-pressing signals into a plurality of groups, wherein each of the groups is regarded as a password element and the password elements together form a multi-key input password set (the step S211). Taking a three-key input password set having five password elements as an example, each password element of the three-key input password set is comprised of three alphanumeric symbols. That is, 15 input signals representing alphanumeric symbols are received and every three alphanumeric symbols are grouped together. The alphanumeric symbols in each group together form a single password element of the three-key input password set. In another embodiment, a multi-key input password having five password elements is used as an example. The password elements of this multi-key input password can be comprised of alphanumeric symbols with different amounts.

In the step S215, the storage device 110 stores the multi-key input password set. More clearly, the storage device 110 stores the multi-key input password sets and the alphanumeric symbol combinations respectively corresponding to the password elements of each of the multi-key input password sets. In one embodiment, the storage device 110 further records the number of the keys for composing each of the password elements of each of the multi-key input password sets.

In the following paragraphs, several embodiments accompanied with drawings are used to further describe different predetermined key-releasing rules of the present invention.

Figure 3:
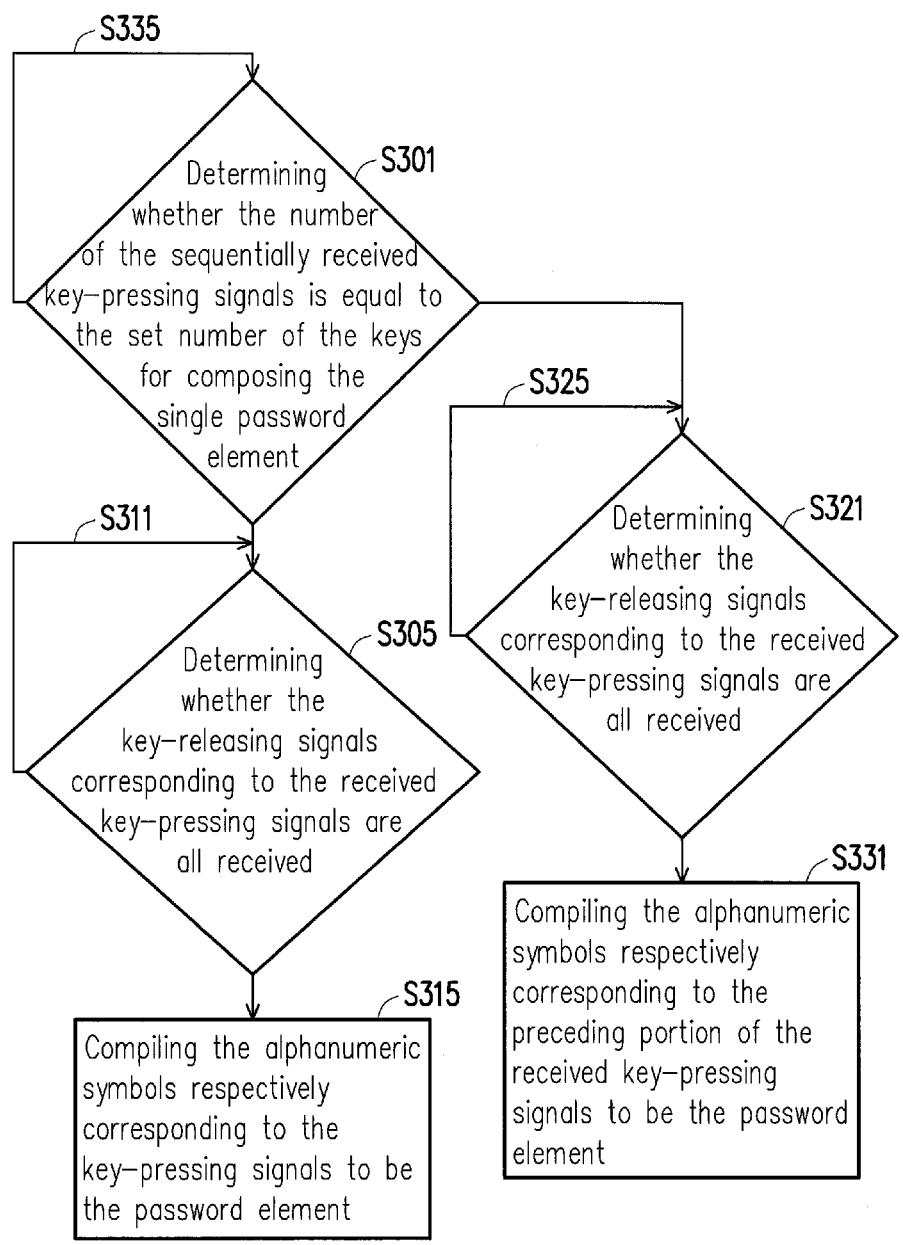
FIG. 3 is a determining flow chart illustrating a predetermined key-releasing rule according to one embodiment of the present invention.

FIG. 3 is a determining flow chart illustrating a predetermined key-releasing rule according to one embodiment of the present invention. In the present embodiment, before the signal receiving unit 102 sequentially receives the input signals (the step S205), the signal receiving unit 102 further receives a selecting signal for determining a number of keys for composing a single password element. That is, before inputting the password elements of the multi-key input password, the user sets the number of the keys for composing the single password element. Hence, the numbers of the keys (i.e. the numbers of the alphanumeric symbols) for respectively composing the password elements of the multi-key input password are the same. As shown in FIG. 3, in the step S301, the processing unit 104 determines whether the number of the sequentially received key-pressing signals is equal to the set number of the keys for composing the single password element. When the number of the sequentially received key-pressing signals is equal to the number of the keys for composing the single password element, the processing unit 104 further determines whether the key-releasing signals corresponding to the received key-pressing signals are all received (the step S305). When not all of the key-releasing signals corresponding to the received key-pressing signals are received, the processing unit 104 waits for receiving at least one key-releasing signal corresponding to the received key-pressing signal (the step S311). Until the key-releasing signals corresponding to the received key-pressing signals are all received, the processing unit 104, in compliance with an receiving order of sequentially receiving the key-pressing signals, compiles the alphanumeric symbols respectively corresponding to the key-pressing signals to be the password element (the step S315).

Alternatively, when the number of the sequentially received key-pressing signals is larger than the number of the keys for composing the single password element, the processing unit 104 determines whether the key-releasing signals corresponding to the received key-pressing signals are all received (the step S321). When not all of the key-releasing signals corresponding to the received key-pressing signals are received, the processing unit 104 waits for receiving at least one key-releasing signal corresponding to the received key-pressing signal (the step S325). Until the key-releasing signals corresponding to a preceding portion of the received key-pressing signals with a received number as same as at least the number of the keys for composing the single password element are received, the processing unit 104, in compliance with the receiving order of sequentially receiving the key-pressing signals, compiles the alphanumeric symbols respectively corresponding to the preceding portion of the received key-pressing signals to be the password element (the step S331). In other words, after setting the number of the keys for composing the single password element, no matter how many input signals the user inputs, the password input system only concerns the preceding portion of the received key-pressing signals with a received number as same as the number of the keys for composing the single password element and compiles the alphanumeric symbols corresponding to the preceding portion of the received key-pressing signals to be the single password element.

Moreover, when the number of the sequentially received key-pressing signals is smaller than the number of the keys for composing the single password element, the processing unit 104 continues waiting for receiving at least another key-pressing signal (the step S335) until the number of the sequentially received key-pressing signals is larger than or equal to the number of the keys for composing the single password element. Then, the processing unit 104 proceeds the steps S305~S315 or the steps S321~S331.

FIG. 4 is a determining flow chart illustrating a predetermined key-releasing rule according to another embodiment of the present invention. As shown in FIG. 4, when the key-pressing signals are sequentially received and the key-releasing signals respectively corresponding to the key-pressing signals are received at the same time (i.e. the pressed keys are released at the same time), the processing unit 104, in compliance with an receiving order of sequentially receiving the key-pressing signals, compiles the alphanumeric symbols respectively corresponding to the key-pressing signals to be the password element (the step S401). In the key-releasing rule of the present embodiment, it is not necessary for the user to set the number of the keys for composing the single password element in advance. Instead, the pressed key for generating the input signals are released at the same time, which is regarded as a trigger movement. Further, according to the trigger movement, the password input system, in compliance with an receiving order of sequentially receiving the key-pressing signals, compiles the alphanumeric symbols respectively corresponding to the key-pressing signals to be the password element. Hence, the numbers of the keys (i.e. the numbers of the alphanumeric symbols) for respectively composing the password elements of the multi-key input password set may not be the same. In other words, the multi-key input password set of the present embodiments have the password elements which may be composed of the alphanumeric symbols respectively in the composing numbers different from each other.

FIG. 5 is a determining flow chart illustrating a predetermined key-releasing rule according to the other embodiment of the present invention. As shown in FIG. 5, in the present embodiment, the password input system further comprises a clock for setting a fixed time window. Within the fixed time window, when the key-pressing signals are sequentially received and the key-releasing signals respectively corresponding to the key-pressing signals are received, the processor 104, in compliance with an receiving order of sequentially receiving the key-pressing signals, compiles the alphanumeric symbols respectively corresponding to the key-pressing signals to be the password element. (the step S501). In the key-releasing rule of the present embodiment, it is not necessary for the user to set the number of the keys for composing the single password element in advance. Instead, the input operations of inputting the multi-key password elements are discriminated according to the fixed time window. Since the numbers of the keys pressed by the user for generating the input signals respectively within the fixed time windows may be different from each other, the numbers of the keys (i.e. the numbers of the alphanumeric symbols) for respectively composing the password elements of the present embodiment may be different from each other. In other words, the multi-key input password set of the present embodiments have the password elements which may be composed of the alphanumeric symbols respectively in the composing numbers different from each other.

It should be noticed that, in order to enhance the security of the password and decrease the possibility of which the password is cracked, the password input interface displayed by the display device 108, according to the key-pressing signals sequentially received by the signal receiving unit, shows the input symbols with the input symbol number as same as the number of the input signals (i.e. the number of the pressed keys). That is, no matter how many keys for composing the single password element, the password input interface only shows the input symbols with the input symbol number equal to the number of the keys pressed by the user to generate the key-pressing signals.

Altogether, in the present invention, the user can press multiple keys to input a single password element. Further, according to the predetermined key-releasing rule, each of the password elements of the multi-key input password set can be a uniform-number multi-key input password element comprised of alphanumeric symbols in a uniform amount or a multiple-number multi-key input password element comprised of alphanumeric symbols in a various amount. Since the keys for the password represent numbers, lowercase letters and uppercase letters and each of the password elements corresponds to at least one alphanumeric symbol combination, the complexity and security of the password are greatly increased and the possibility of which the password is cracked is decreased.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A password input system, comprising:
  a signal receiving unit receiving a plurality of input signals sequentially, wherein the input signals include a plurality of key-pressing signals and a plurality of key-releasing signals respectively corresponding to the key-pressing signals and each of the key-pressing signals corresponds to an alphanumeric symbol;
  a processing unit, according to a predetermined key-releasing rule, sequentially grouping the alphanumeric symbols corresponding to the key-pressing signals into a plurality of groups, wherein each of the groups is regarded as a password element and the password elements together form a multi-key input password set; and
  a storage device storing the multi-key input password set, wherein the signal receiving unit further receives a selecting signal for determining a number of keys for composing a single password element and the predetermined key-releasing rule comprises:

a. when a number of the sequentially received key-pressing signals is equal to the number of the keys for composing the single password element and until the key-releasing signals corresponding to the received key-pressing signals are all received, compiling the alphanumeric symbols respectively corresponding to the key-pressing signals in compliance with an receiving order of sequentially receiving the key-pressing signals to be the password element;
b. when the number of the sequentially received key-pressing signals is larger than the number of the keys for composing the single password element and until the key-releasing signals corresponding to a preceding portion of the received key-pressing signals with a received number as same as at least the number of the keys for composing the single password element are received, compiling the alphanumeric symbols respectively corresponding to the preceding portion of the received key-pressing signals in compliance with the receiving order to be the password element; and
c. when the number of the sequentially received key-pressing signals is smaller than the number of the keys for composing the single password element, waiting for receiving at least another key-pressing signal until the number of the sequentially received key-pressing signals is larger than or equal to the number of the keys for composing the single password element and then proceeding the step a or the step b.

2. The password input system of claim 1, further comprising a display device for displaying a password input interface, wherein the password input interface, according to the key-pressing signals received by the signal receiving unit, displays a plurality of input symbols with an input number of the input symbols as same as a number of the sequentially received key-pressing signals.

3. A method for inputting a password, comprising:
receiving a selecting signal for determining a number of keys for composing a single password element;
receiving a plurality of input signals sequentially, wherein the input signals include a plurality of key-pressing signals and a plurality of key-releasing signals respectively corresponding to the key-pressing signals and each of the key-pressing signals corresponds to an alphanumeric symbol;
while the input signals are received, according to a predetermined key-releasing rule, sequentially grouping the alphanumeric symbols corresponding to the key-pressing signals into a plurality of groups, wherein each of the groups is regarded as a password element and the password elements together form a multi-key input password set; and
storing the multi-key input password set,
wherein the predetermined key-releasing rule comprises:
a. when a number of the sequentially received key-pressing signals is equal to the number of the keys for composing the single password element and until the key-releasing signals corresponding to the received key-pressing signals are all received, compiling the alphanumeric symbols respectively corresponding to the key-pressing signals in compliance with an receiving order of sequentially receiving the key-pressing signals to be the password element;
b. when the number of the sequentially received key-pressing signals is larger than the number of the keys for composing the single password element and until the key-releasing signals corresponding to a preceding portion of the received key-pressing signals with a received number as same as at least the number of the keys for composing the single password element are received, compiling the alphanumeric symbols respectively corresponding to the preceding portion of the received key-pressing signals in compliance with the receiving order to be the password element; and
c. when the number of the sequentially received key-pressing signals is smaller than the number of the keys for composing the single password element, waiting for receiving at least another key-pressing signal until the number of the sequentially received key-pressing signals is larger than or equal to the number of the keys for composing the single password element and then proceeding the step a or the step b.

4. The method of claim 3, further comprising displaying a password input interface, wherein the password input interface, according to the key-pressing signals received by the signal receiving unit, displays a plurality of input symbols with an input number of the input symbols as same as a number of the sequentially received key-pressing signals.

* * * * *